United States Patent Office 3,548,408
Patented Dec. 15, 1970

3,548,408
PROCESS FOR ESTERIFICATION OF POLYMERS CONTAINING ALCOHOLIC GROUPS
Roy Worrall, Newport, England, assignor to Monsanto Chemicals Limited, London, England, a British company
No Drawing. Filed Oct. 24, 1967, Ser. No. 677,743
Claims priority, application Great Britain, Oct. 26, 1966, 48,104/66; Jan. 13, 1967, 1,860/67
Int. Cl. C08h 27/14
U.S. Cl. 260—87.3     8 Claims

ABSTRACT OF THE DISCLOSURE

A process for the esterification of polymers containing alcoholic groups wherein hydrolyzed interpolymers of esters of unsaturated alcohols and olefins, such as a hydrolyzed interpolymer of ethylene and vinyl acetate, are converted to polymers containing acid groups by reacting said interpolymers with an anhydride such as maleic or phthalic anhydride while the polymers are in the solid or molten state.

BACKGROUND OF THE INVENTION

This invention relates to the production of resins. More particularly, the present invention relates to a process for the production of resins containing acid or salt groups from resins containing alcoholic groups.

It is known that resins containing acid groups can be obtained by the polymerization of acid monomers such as acrylic acid, for example. This approach, however, suffers from certain drawbacks since in many cases the polymerization is complicated by side reactions or uncontrolled cross-linking which often results in producing polymers having undesirable properties.

SUMMARY

According to the present invention, there is provided a process for esterification of polymers containing alcoholic groups which comprises reacting the polymers in solution or in the solid or molten state with a suitable esterifying agent such as an acid, an acid anhydride or an acid halide.

In the process of the invention, the reaction of the esterifying agent with the alcoholic groups in the resin starting material is believed to take place according to the equation:

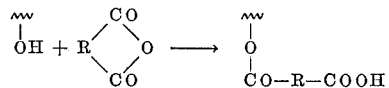

where the zig-zag line represents part of the resin chain and R is a divalent radical forming part of the anhydride. Derivative resins can be obtained by further reacting the esterified product with other reagents, for example, with a base so as to form a resin containing salt groups. Such further reaction with a base can be conducted concurrently so that the product containing salt groups is isolated directly. The resin chain or back-bone of the starting material is not normally affected by the reaction although some cross-linking of resin chains by salt groups can be effected if desired by appropriate choice of reactants.

It is, therefore, an object of the present invention to provide a process for the esterification of hydroxyl-containing polymers.

It is a further object of the present invention to provide a process for the production of polymers containing acid or salt groups.

A still further object is to provide a process for the esterification of polymers in the molten state.

These and other objects will be apparent from the following description, examples, and appended claims.

DESCRIPTION OF THE PREFFERED EMBODIMENTS

Almost any synthetic resin containing alcoholic groups can be used as the starting material in the practice of the present invention. It can, for example, be a polyester or polyether derived from a triol such as glycerol, so that free alcoholic groups are present as side groups on the resin chain. Preferably, however, the starting material is a polymer of an unsaturated alcohol. The unsaturated alcohol is preferably aliphatic, and can be, for example, vinyl alcohol (notionally), a substituted vinyl alcohol, allyl alcohol or crotyl alcohol. Alternatively, it can be a cyclic alcohol such as, for instance, 2-cyclohexene-1-ol or an aromatic alcohol such as p-vinylbenzyl alcohol.

The resin starting material can often be produced by polymerization of the appropriate unsaturated alcohol. This is not always possible as, for example, where the unsaturated alcohol is the notional vinyl alcohol. It is convenient in these latter cases to prepare the starting material by the hydrolysis of a polymer of an ester of the unsaturated alcohol. Suitable esters include, for instance, those formed by the combination of the alcohol with an aliphatic monocarboxylic acid such as acetic, propionic, butyric, caprylic, or stearic acid, or an aromatic monocarboxylic acid, such as benzoic acid or toluic acid. The hydrolysis reaction can be effected in solution in water or an inert solvent, for example, an aromatic hydrocarbon such as benzene or toluene. However, a preferred method of producing such hydrolyzed polymers is described in a copending application Ser. No. 639,631 filed May 19, 1967, in which hydrolysis is brought about in the molten state.

Preferably, the starting resin is an interpolymer of an unsaturated alcohol with an olefinic hydrocarbon such as ethylene, propylene, 1-butene, isobutene, or a higher homolog having either a straight or branched chain, for example, 1-hexene or 2,2,4-trimethyl pentene-1. Two or more olefins can be present in the resin if desired. The olefinic hydrocarbon component, can be or can contain a cyclic olefin, such as cyclopentene or a compound having more than one olefinic bond, for example, butadiene, isoprene, or 1,5-hexadiene, or an aryl olefin such as styrene. Ethylene is especially preferred as the olefinic comonomer.

The resin starting material can contain other comonomers if desired, as for example a nitrile, such as acrylonitrile; vinyl or vinylidene chloride; an ester of an unsaturated acid such as an acrylate or a methacrylate; or very often an ester of an unsaturated alcohol, such as vinyl acetate. In the latter case, the starting material can be produced by the partial hydrolysis of a polymer of the appropriate ester. Thus, a desirable starting material can be, for example, an interpolymer of ethylene, vinyl acetate and vinyl alcohol obtained by the partial hydrolysis of an ethylene-vinyl acetate interpolymer.

When the starting resin is an interpolymer, the amount of unsaturated alcohol present can be up to 90% by weight, although generally the alcohol content will be from 3% to 75% by weight and preferably from 5% to 50% by weight of the total.

In general, the esterifying agent can be an acid, an acid halide, an acid anhydride or an ester, the last case constituting a transesterification reaction. The esterifying agent can be inorganic or organic. Suitable inorganic agents include mineral acids such as sulfuric, hydrochloric, nitric and phosphoric acids; acid halides such as sulfonyl chloride; and anhydrides such as sulfur trioxide. Usually, however, the esterifying agent is an organic compound such as a carboxylic acid or an appropriate derivative thereof, as for example, the acid halide or anhydride. It can be aliphatic or aromatic, and where it is aliphatic, it can be saturated or unsaturated. It can contain an inert substituent, such as, for instance, a halogen or an alkoxy group, if desired. Examples of suitable organic esterifying agents include fatty acids such as formic, acetic, propionic, butyric, caproic, lauric and stearic acids; unsaturated carboxylic acids such as acrylic, methacrylic, crotonic and oleic acids; halogen-containing aliphatic acids such as dichloroacetic acid; dicarboxylic, tricarboxylic and polycarboxylic aliphatic acids such as succinic, adipic, tricarballylic, maleic and fumaric acids; alicyclic acids such as cyclohexanecarboxylic acid; aromatic acids such as benzoic, toluic, phthalic, terephthalic, benzene-1,2,4-tricarboxylic and phenylacetic acids and their nuclear-substituted derivatives; and the acid anhydrides, acid halides and lower alkyl esters of these acids, i.e., an alkyl ester in which the alkyl group contains up to four carbon atoms. Other organic esterifying agents include, for example, sulfonic acids such as benzene sulfonic acid and their acid halides.

In the preferred case, the esterifying agent is an acid containing at least two carboxyl groups or its anhydride or acid halide. When the preferred esterifying agents are used, the esterified product contains acid groups and can be further reacted to form derivative resins. For example, a base can be used to produce a derivative resin containing salt groups. The reaction with a base can be conducted concurrently so that the salt-group-containing product is isolated directly. Especially desirable as esterifying agents are the anhydrides. One class of anhydrides that has been found particularly useful comprises those derived from acids comprising two carboxyl groups separated by a substituted or unsubstituted saturated or unsaturated chain of two or more carbon atoms. The chain can be straight-chain or branched. Examples of suitable anhydrides in this class include succinic, glutaric, adipic, maleic, citraconic, itaconic, glutaconic and aconitic anhydrides and their substituted derivatives. Another class of very useful anhydrides comprises those derived from aromatic dicarboxylic acids such as, for example, phthalic and naphthalic anhydrides and their nuclear substituted alkyl, halo and alkoxy derivatives. An anhydride derived from a tricarboxylic or polycarboxylic acid such as benzene-1,2,4-tricarboxylic acid can also be used if desired.

The process need not lead to a complete esterification of all of the alcoholic groups in the resin starting material. For many purposes, a partial esterification, for example up to 10%, is sufficient. In any event, the esterifying agent needs to be employed in a sufficient stoichiometric proportion to esterify the resin to the required degree, and very often it is preferable to operate using a 10 to 20% excess of the agent. When esterification is carried out in the solid state, a greater excess is frequently employed.

If desired, a catalyst can be used, particularly an acid- or alkaline-reacting catalyst. Examples of suitable catalysts include mineral acids such as sulfuric acid, alkali-metal salts of weak acids such as sodium acetate or sodium carbonate, alkali-metal hydroxides such as sodium hydroxide and amines such as pyridine. Where the esterifying agent is a dicarboxylic acid, its acid chloride or anhydride, the use of an alkaline-reacting catalyst results in salt formation with the carboxyl groups in the product. However, these salt groups can, in turn, be converted to acidic carboxyl groups by the action of an acid such as, for example, sulfuric acid or hydrochloric acid. When a catalyst is employed, it is generally present in an amount up to about 5% and preferably from about 0.1% to about 2% by weight of the esterifying agent.

As has been pointed out, the esterification can be carried out with the starting polymer in solution, in the solid state, or in the molten state. Generally, reaction in either the solid or molten state is preferred since isolation of the final product is more easily accomplished. It is especially preferred to conduct the esterification with the resin in the molten state.

When a solution method is used, the solvent needs to be substantially inert under the reaction conditions. A liquid aromatic hydrocarbon such as benzene, toluene or xylene is preferably employed as a solvent, but other suitable solvents include pyridine or solvent naphtha. The temperature employed cannot, of course, be greater than the boiling point of the solvent at the reaction pressure. In many cases, the reaction can be carrier out under reflux, or the pressure can, if necessary, be increased so as to raise the boiling point of a relatively volatile solvent to a temperature at which the reaction rate is satisfactory.

When a solid resin starting material is to be esterified the esterifying agent is often employed as a solution in an inert solvent that does not dissolve the resin, and the above considerations as to temperatures and pressures for the solution method then also apply with respect to this solvent. For a solid-state esterification, the reaction temperature is, of course, less than that at which the resin melts, but in most instances, particularly those where the proportion of unsaturated alcohol in an interpolymer resin is relatively low, for example, less than 20% by weight, it is preferred to operate at a temperature which does not differ from the melting point by more than 35° C. This has been found to assist in insuring in these instances that the esterification reaction occurs at a convenient rate. Preferably, the reaction temperature is within 25° C. of the temperature at which the resin melts. A solvent for the esterifying agent can soften the resin even though it does not dissolve it and thus cause its melting point to be depressed, in some instances by as much as 30° C., below its ordinary value. This latter effect needs to be taken into account in choosing an appropriate reaction temperature. It may sometimes be found that a reaction temperature that is relatively close to the resin melting point is too high, for example, where the esterifying agent is dissolved in a relatively volatile solvent. In such cases, the resin melting point can be lowered by the addition of a suitable softening agent which is preferably an organic liquid which softens but does not dissolve (or is not used in sufficient proportion to dissolve) the resin under the reaction conditions. Examples of suitable softening agents include such hydrocarbon liquids as the petroleum fraction known as white spirit or an aromatic or naphthenic fraction such as, for instance, benzene, toluene, xylene or cyclohexane.

Where the resin is reacted in the solid state, it can be in any physical form but, preferably, it is of such a shape that a relatively large surface area of the resin is exposed to the action of the esterifying agent so as to facilitate the esterification. For example, the resin can be used as a powder, pellets or other particulate form, or as a film or sheet, a fibre or a foam. Resins in more massive shapes, for example, molded or extruded articles can also be esterified. All such forms having a smallest dimension of from 1 to 15 mm., for instance, from 3 to 10 mm., can be subjected to the process of the invention. If desired, the reaction can be stopped before completion so that it is confined to the surface of a molded or other shaped article and there is formed a "skin" of different composition from the remainder of the article. This facility is useful where it is desired to impart antistatic properties to an article or improve its receptiveness to printing inks. Normally, the shape of the article is unchanged during the course of the reaction and little, if any, dimensional changes occur.

In the particularly preferred method of operation when the process is carried out with the resin in the molten state, the reaction temperature is, of course, higher than that at which the resin melts. However, the temperature should not be so high as to cause decomposition of the resin. A temperature between 30 to 150° C. higher than that at which the resin melts is usually satisfactory. As in the solid-state esterification, the presence of the esterifying agent can soften the resin and thus cause the resin melting point to be depressed, in some instances by as much as 30° C., below its ordinary value. This latter effect needs to be taken into account in choosing an appropriate reaction temperature. In some cases, when reaction is carried out in the molten state, it is found that a reaction temperature above the resin melting point is too high for operation with relatively volatile esterifying agents such as a lower fatty acid. In such cases, the melting point of the resin can be lowered by the addition of a suitable softening agent as explained above for the solid state esterification.

The process can be carried out at atmospheric pressure, but generally the use of an elevated pressure from 5 to 5,000 p.s.i.g., preferably 500 to 2,000 p.s.i.g. is employed in order to prevent evaporation of any solvent or softening agent present or possibly of the esterifying agent itself. The reagent can be present as a gas or vapor.

The process can be carried out by a batch or continuous method although a batch method is usually preferable where the resin is esterified in solid form. In general, it is often convenient to effect a batch process in a reaction vessel provided with suitable agitating means that is either fitted with a reflux condenser or can be sealed from the atmosphere and can be heated to the appropriate temperature. The reaction time can be from a few seconds to several hours depending upon the conditions of temperature, catalyst and so on. When the resin is in solution, reaction times from 1 hour up to 12 hours are sufficient although sometimes up to five or six days may be necessary. Reaction in the solid state can require longer periods of up to two weeks in some cases. A batch reaction can be continued until substantial equilibrium is reached or can be stopped at an intermediate stage. At the end of the esterification, any excess pressure in the reaction vessel is released and the resin product is removed. Any excess of anhydride, catalyst residues, solvent or softening agent present can, if desired, be removed by washing with a suitable liquid, for example, water.

To effect a batch process with the polymer in the molten state, a vessel which can be sealed from the atmosphere and heated to the appropriate temperature such as a Banbury or other internal mixer makes a suitable reaction vessel. A time from a few seconds to several minutes is normally all that is necessary to complete the reaction. Usually, times between 10 seconds and 30 minutes, and preferably 25 seconds to 10 minutes are employed. The reaction can be continued until substantial equilibrium is reached or it can be stopped at an intermediate stage. At the end of the reaction, the pressure in the reactor vessel is released and the product resin is removed. Any excess of esterifying agent, catalyst residues and softening agent present can, if desired, be removed by washing the product with a suitable liquid, for example, water.

For a continuous process with the polymer in the molten state, the use of a kneader or a screw extruder is particularly convenient, the esterifying agent being either fed into the machine hopper together with the resin starting material or injected separately into the interior of the apparatus at a point where some heat-softening of the resin has already taken place. The reaction then proceeds as the mixture is forwarded through the apparatus, and with an appropriate adjustment of forwarding rate the residence time can be chosen so that reaction is completed to the required degree by the time the mixture reaches the mouth of the apparatus. An appropriate die can, of course, be fitted to an extruder where a particular extruded section is required. For instance, a sheet or blown film can be produced or the resin can be extruded as a rod and cut into pellets. A water-cooling bath can be used to wash the product. It is also possible to include a blowing agent, for instance, a gas or vapor, a volatile liquid or a substance that yields gas by thermal decomposition, so that the product resin is extruded in the form of a foam.

A volatile hydrocarbon, for example, butane, is often a particularly useful blowing agent and this can also act as a softening agent as described in a previous paragraph. A nucleating agent, for example, a finely divided solid such as silica, can be present if desired in order to facilitate the production of a large number of small cells.

It is also possible to carry out a continuous molten state esterification process in the extruder of a blow-molding machine or in the preplasticizing section of a screw-preplasticizing injection-molding machine so that shaped articles are produced directly.

The product resins can be used in a wide variety of applications depending on the nature of the esterifying groups and the extent to which the reaction has taken place. For example, esterification of alcoholic groups in a polyvinyl alcohol reduces water-solubility and many resins esterified by unsaturated acids are capable of polymerization with unsaturated monomers to produce thermoset structures. A process of the latter kind is, for example, described in British patent specification No. 968,463.

Where the esterifying agent is an acid containing at least two carboxyl groups or its anhydride or acid halide, the product resin contains acid groups or salt groups as explained above. Product resins containing acid groups are of special value as intermediates for the production of derivative resins. For example, the acid groups can be converted by the ordinary methods of organic chemistry to salt, ester or amide groups which confer characteristic properties on the derivative resin. Where the product resin is reacted with a bifunctional substance, for example, an oxide or hydroxide of a di- or trivalent metal such as zinc oxide or a dihydric or trihydric alcohol such as ethylene glycol or glycerol or a di- or polyamine such as, for instance, ethylene-diamine or phenylenediamine, there is produced a derivative resin having cross-links that impart to it increased strength, rigidity and resistance to elevated temperatures. Monovalent ions can also give rise to more weakly cross-linked products as a result of ion-sharing. A particularly useful kind of cross-linked product can also be produced by reacting a resin containing acid groups with a resin containing alcoholic groups, such as a hydrolyzed polymer of ethylene and vinyl acetate, or with a partially esterified resin having residual hydroxyl groups. Cross-linked products are often particularly useful in foamed form, and for example where an extruded foam is being produced, the cross-linking reaction can be arranged to take place in the extruder barrel, or shortly after extrusion has taken place, so that the foam structure is stabilized as a result of the increased stiffness of the cross-linked product.

Where the product resins contain salt groups, they are generally found to be of good clarity, tough and strong but nevertheless easily processible by ordinary thermoplastic techniques and, accordingly, find use in the production of films and molded or extruded articles.

The invention is illustrated by the following examples which are not intended to limit the scope thereof.

EXAMPLE 1

Twenty grams of an interpolymer of ethylene, vinyl alcohol and vinyl acetate (obtained by the 90% hydrolysis of an interpolymer of 87.5% by weight of ethylene and 12.5% by weight of vinyl acetate) were dissolved in 80 grams of xylene at 85° C. and 15 grams of phthalic anhydride and 20 grams of pyridine were added. The mixture was kept at 85° C. for about 70 hours, after which it was diluted with 500 grams of xylene at 85° C. and the diluted solution poured into 2,000 grams of methyl alcohol. A white resin was precipitated and this was filtered off, washed with 500 grams of methyl alcohol and dried. The product contained carboxylic groups which could be neutralized by caustic soda. It was shown by comparison of its infrared absorption at 5.8 microns (CO absorption) with that at 6.8 microns ($CH_2$ absorption) to have been completely esterified by the phthalic anhydride, for the ratio of the optical density of the product at 5.8 microns to that at 6.8 microns was 1.72, which corresponds closely to the ratio of 1.68 which is obtained for an unhydrolyzed interpolymer of ethylene and vinyl acetate. The ratio for the original 90% hydrolyzed interpolymer was only 0.17.

A portion of the product was converted to its sodium salt by dissolving it in toluene at 85° C. and pouring the solution into a 0.1 N solution of sodium hydroxide in methyl alcohol. The resin salt was thereby precipitated as a white solid and was filtered off. It had a relatively high melt viscosity and could be converted to a clear, tough film by pressing between two sheets of polished steel at 180° C. It was insoluble in but swollen by hot organic solvents.

EXAMPLE 2

The procedures described in Example 1 were repeated using 12 grams of succinic anhydride in place of the phthalic anhydride. The acid resin product was again found to have been completely esterified, the $CO/CH_2$ optical density ratio determined as in Example 1 being 1.68. The acid product and its sodium salt had properties similar to those of the products of Example 1.

EXAMPLE 3

One hundred grams of the 90% hydrolyzed ethylene-vinyl acetate interpolymer used in Example 1 were dissolved in 400 grams of xylene at 145° C. and 22 grams of phthalic anhydride were added. The solution was stirred at 145° C. for 2 hours and it was then diluted with 500 grams of xylene at 85° C. and poured into 4,000 grams of methyl alcohol at room temperature. The mixture was allowed to cool to room temperature and the precipitated resin was then filtered off and washed with water.

The product was a tough white resin and had a $CO/CH_2$ optical density ratio (determined as in Example 1) of 0.58, which corresponds to 34% esterification of the hydroxyl groups originally present in the starting resin. The presence of hydroxyl groups in the partially esterified resin was demonstrated by a relatively broad and weak absorption at 2.9 microns, the radio of the optical density at this wave length to that at 6.8 microns (the "$OH/CH_2$ optical density ratio") being 0.12.

Conversion of a portion of the resin to its sodium salt as described in Example 1 gave a product from which a tough clear film could be obtained as described in Example 1 and which was insoluble in but swollen by hot organic solvents.

EXAMPLE 4

The procedures described in Example 3 were repeated using 15 grams of succinic anhydride in place of the phthalic anhydride. The acid resin product had a $CO/CH_2$ optical density ratio of 0.84 and an $OH/CH_2$ optical density ratio of 0.07, which indicates that 50% of the hydroxyl groups originally present in the starting resin had been esterified by succinic anhydride.

The sodium salt of the resin could be converted to a tough clear film and it was insoluble in but swollen by hot organic solvents.

EXAMPLE 5

The procedures described in Example 3 were repeated using 15 grams of maleic anhydride in place of the phthalic anhydride. The acid resin product had a $CO/CH_2$ optical density ratio of 0.88 and an $OH/CH_2$ optical density ratio of 0.07, which indicates that 71% of the hydroxyl groups originally present in the starting resin had been esterified by maleic anhydride.

A sample of the product was heated for 10 minutes at 155° C., which resulted in the formation of a tough cross-linked resin from which an almost clear sheet could be produced by pressing between polished steel sheets for 4 minutes at a pressure of 25 tons per square inch.

A sodium salt of the uncross-linked resin could be converted to a tough clear film and it was insoluble in but swollen by hot organic solvents.

EXAMPLE 6

Fifty grams of the 90% hydrolyzed ethylene-vinyl acetate interpolymer used in Example 1, in the form of cubiform pellets of side 0.1 inch, were tumbled with a solution of 11 grams of phthalic anhydride and 15 grams of pyridine in 100 grams of acetone in a pressure vessel at 85° C. for 20 hours. The pellets were washed with methyl alcohol and dried and although they were of unchanged appearance and dimensions, they were found on infrared analysis to have undergone 40% esterification by the phthalic anhydride. The resin had a $CO/CH_2$ optical density ratio of 0.67 and an $OH/CH_2$ optical density ratio of 0.10.

A portion of the acid resin was converted to its sodium salt by the method described in Example 1.

EXAMPLE 7

Fifty grams of the 90% hydrolyzed ethylene-vinyl acetate interpolymer used in Example 1 (in the form of a fine powder) were tumbled with 200 grams of molten maleic anhydride in a closed glass bottle at 65° C. for 20 hours. The resin was filtered off, washed with methyl alcohol and dried. It was unchanged in physical form and appearance, but was found on infrared analysis to have $CO/CH_2$ optical density ratio of 1.3 and an $OH/CH_2$ optical density ratio of 0.13, showing that 85% of the hydroxyl groups originally present had been esterified.

A portion of the acid resin was converted to its sodium salt by the method described in Example 1.

EXAMPLE 8

About 2.6 kilograms of the 90% hydrolyzed ethylene-vinyl acetate interpolymer used in Example 1 in the form of cubiform pelets of said 0.1 inch were stirred with 2.6 kilograms of maleic anhydride and 2.6 kilograms of toluene for 40 hours at 65° C. in a stainless steel reactor of capacity 10 litres. The resin was filtered from the excess maleic anhydride and toluene, washed with methyl alcohol and dried. The product consisted of a 95% yield of a resin having the structure of an interpolymer of ethylene and monovinyl maleate. On infrared analysis it was found to have a $CO/CH_2$ optical density ratio of 1.24 and an $OH/CH_2$ optical density ratio 0.0, indicating complete esterification.

About 1.0 kilogram of the acid resin was converted to its sodium salt by stirring with 59 grams of sodium hydroxide dissolved in a mixture of 1 kilogram of methyl alcohol and 1 kilogram of water in an autoclave at 70° C. for 24 hours. The pellets were washed with methyl alcohol and dried to give a neutral resin of high tensile and impact strengths that was insoluble in hot organic solvents.

A half-neutralized sodium salt of the acid resin was also produced as in the previous paragraph but using only 25 grams of sodium hydroxide.

EXAMPLE 9

One hundred grams of an ethylene-vinyl acetate interpolymer containing 87.5% by weight of ethylene and 12.5% by weight of vinyl acetate in the form of cubic pellets of 3/32 inch side were tumbled with 100 grams of methyl alcohol containing 1.2 grams sodium methoxide and 100 grams of toluene in a pressure vessel at 70° C. for 20 hours. By this treatment, 92% of the acetate groups were replaced by hydroxyl groups. The vessel and its contents were cooled at 20° C. and the supernatant liquid was decanted. The pellets were then treated with 100 grams of maleic anhydride and 100 grams of toluene at 70° C. for 24 hours during which time the hydroxyl groups were converted to hydrogen maleate groups. The supernatant liquid was again decanted and the pellets were washed free of the excess of maleic anhydride by infusion first with methyl alcohol and then with water at 70° C. Finally, the pellets were steeped with a solution of 5.9 grams of sodium hydroxide in 200 grams of an equal weight mixture of methyl alcohol and water in a pressure vessel at 70° C. to give the desired sodium salt still in the form of original pellets.

When the weight of sodium methoxide in the above example was reduced to 0.1 gram the degree of hydrolysis was 28%. Reesterification as in Example 8 gave a resin containing 85.5% by weight ethylene, 8.8% by weight vinyl acetate and 5.7% by weight vinyl hydrogen maleate. This was neutralized using 1.9 grams of sodium hydroxide to give the ionized form.

EXAMPLE 10

Fourteen kilograms of the 90% hydrolyzed ethylene-vinyl acetate interpolymer used in Example 1 in the form of cubiform pellets of side 0.1 inch, were stirred with 14 kilograms of maleic anhydride and 14 kilograms of toluene for 12 hours at 65° and 70° C., after which time half the alcohol groups had been converted to hydrogen maleate groups. The resin was filtered from the excess maleic anhydride and toluene, washed with methyl alcohol and dried. The product had the structure of an interpolymer of 86.7% ethylene, 9.4% vinyl hydrogen maleate, 2.8% vinyl alcohol and 1.1% vinyl acetate by weight.

EXAMPLE 11

Sixteen kilograms of a resin having the structure of an interpolymer of ethylene, vinyl alcohol and vinyl acetate (obtained by the 30% hydrolysis of an interpolymer of 87.5% by weight of ethylene and 12.5% by weight of vinyl acetate) were stirred with 16 kilograms of maleic anhydride and 16 kilograms of toluene for 40 hours at 65° C. At the end of this time all of the alcoholic groups in the starting resin had been esterified. The product resin was filtered off, washed with methyl alcohol and dried. It had the structure of an interpolymer of 85.5% ethylene, 5.9% vinyl hydrogen maleate and 8.6% vinyl acetate by weight.

Two portions of the product were respectively 50% and 100% neutralized by aqueous alcoholic sodium hydroxide solution to produce corresponding resins containing salt groups.

In a similar manner, a resin obtained by the 60% hydrolysis of an interpolymer of 87.5% by weight ethylene and 12.5% by weight vinyl acetate was converted to a resin having the structure of an interpolymer of 83.4% ethylene, 11.8% vinyl hydrogen maleate and 4.8% vinyl acetate by weight. Three portions of the product were respectively 25%, 50% and 100% neutralized with aqueous alcoholic sodium hydroxide solution to produce corresponding resins containing salt groups.

EXAMPLE 12

The esterification procedure described in Example 1 was repeated except that the resin starting material consisted of 20 grams of a resin that had been obtained by the 95% hydrolysis of an interpolymer of 67% by weight of ethylene and 33% by weight of vinyl acetate, and the weight of phthalic anhydride used was 66 grams. The product was a white resin having the structure of an interpolymer of 48.4% by weight ethylene, 50.4% by weight vinyl hydrogen phthalate and 1.2% by weight vinyl acetate.

EXAMPLE 13

A portion (7.2 grams) of the acid-group-containing resin produced in Example 1 and 5.0 grams of the hydrolyzed ethylene-vinyl acetate interpolymer used as starting material in Example 1 were dissolved in xylene, the solution thus containing equivalent proportions of acid and alcoholic groups, and the solution was used to cast a thin film on a sheet of paper coated with a silicone release agent. The film was cured at 180° C. for 20 minutes, at the end of which time it had become insoluble in boiling toluene.

In another experiment, a film cast from a xylene solution of equivalent proportions of the acid-group-containing resin produced in either Example 2 or Example 8 and the hydrolyzed ethylene-vinyl acetate interpolymer used as starting material in Example 1 became insoluble in boiling toluene after less than 2 minutes at 180° C. Similarly, a film cast from a xylene solution of equivalent proportions of the acid-group-containing resin produced in the first part of Example 11 and the 30% hydrolyzed ethylene-vinyl acetate interpolymer used as a starting material in that example became insoluble in boiling toluene after 2 to 3 minutes at 180° C.

A film cast from a xylene solution of the resin produced in Example 10 (which contained both acid and hydroxyl groups) became self-cross-linked after 5 to 8 minutes at 120° C.

EXAMPLE 14

One thousand grams of a resin obtained by the 90% hydrolysis of an interpolymer of 87.5% by weight of ethylene and 12.5% by weight of vinyl acetate were dry-blended with 220 grams of powdered phthalic anhydride and the mixture was extruded through a circular orifice die to produce a strand of diameter 0.1 inch. The strand was chopped into pellets. The extruder had an internal barrel diameter of 1 inch. The throughput was 17 grams per minute, with a residence time of the mixture within the barrel of about 1 minute and a barrel temperature of 200° C.

The product was a tough white resin containing carboxyl groups. It was shown by comparison of its infrared absorption at 5.8 microns (CO absorption) with that at 6.8 microns ($CH_2$ absorption) to have been 54–57% esterified by the phthalic anhydride, inasmuch as the ratio of the optical density of the product at 5.8 microns to that at 6.8 microns was 0.65. (A ratio of 1.68 is obtained for an unhydrolyzed interpolymer of ethylene and vinyl acetate while the ratio for the original 90% hydrolyzed interpolymer was only 0.17.) The presence of hydroxyl groups in the partially esterified resin was demonstrated by a relatively broad and weak absorption at 2.9 microns, the ratio of the optical density at this wave length to that at 6.8 microns (the "OH/$CH_2$ optical density ratio") being 0.12.

A portion of the product was converted to its sodium salt by dissolving it in toluene at 85° C. and pouring the solution into a 0.1 N solution of sodium hydroxide in methyl alcohol. The resin salt was thereby precipitated as a white solid and was filtered off. It had a relatively high melt viscosity and a clear tough film could be obtained by pressing it between 2 sheets of polished steel at 180° C. It was insoluble in but swollen by hot organic solvents.

EXAMPLE 15

Fifty grams of the hydrolyzed ethylene-vinyl acetate interpolymer used in Example 14 were heat-softened and worked on a mill-roll at 150° C. and 6.1 grams of anhydrous sodium acetate were blended into it. Eleven grams of phthalic anhydride were introduced gradually into the mixture and the temperature was increased to 170° C. for 15 minutes. Acetic acid was evolved during the reaction.

The resulting resin was flexible, tough and insoluble in hot organic solvents although it was still thermoplastic. A portion was converted to its acid form by swelling it with toluene and reacting it with aqueous hydrochloric acid (15% HCl by weight) and pouring the resulting solution into acidified methyl alcohol. The acid resin had a CO/$CH_2$ optical density ratio of 0.85 and an OH/$CH_2$ optical density ratio of 0.08, showing that about 50% esterification by the phthalic anhydride had taken place.

EXAMPLE 16

The procedure described in the first part of Example 15 was repeated using 7.3 grams of maleic anhydride in place of the phthalic anhydride. The product was a very tough insoluble resin of high melt viscosity. A portion was converted to its acid form as described in Example 15 and was then found to have a $CO/CH_2$ optical density ratio of 0.71 and an $OH/CH_2$ optical density ratio of 0.08, showing that about 57% esterification by the maleic anhydride had taken place.

What is claimed is:

1. A process for the esterification of a polymer containing alcoholic groups which comprises subjecting a hydrolyzed interpolymer of an ester of an unsaturated alcohol and an olefin to the action of an anhydride of an acid containing at least two carboxylic groups, said carboxylic groups being separated by at least two carbon atoms, while the polymer is in the molten state, the temperature is maintained between about 30° and 150° C. higher than the melting point of the polymer and the pressure is maintained at from about 5 to about 5,000 p.s.i.g.

2. The process of claim 1 wherein said hydrolyzed interpolymer is an interpolymer of ethylene and vinyl acetate.

3. The process of claim 2 wherein said anhydride is phthalic anhydride.

4. The process of claim 3 wherein said interpolymer contains from 5 to 50% of vinyl aectate.

5. A process for the esterification of a polymer containing alcoholic groups which comprises subjecting a hydrolyzed interpolymer of an ester of an unsaturated alcohol and an olefin to the action of an anhydride of an acid containing at least two carboxylic groups, said carboxylic groups being seprated by at least two carbon atoms, while the polymer is in the solid state, the temperature is maintained within 25° C. of the temperature at which the polymer melts and the pressure is maintained at from about 5 to about 5,000 p.s.i.g.

6. The process of claim 5 wherein said hydrolyzed interpolymer is an interpolymer of ethylene and vinyl acetate.

7. The process of claim 6 wherein said anhydride is maleic anhydride.

8. The process of claim 7 wherein said interpolymer contains from 5 to 50% vinyl acetate.

References Cited

UNITED STATES PATENTS

| | | | |
|---|---|---|---|
| 2,145,345 | 1/1939 | Dreyfus | 260—2 |
| 2,332,460 | 10/1943 | Muskat et al. | 260—83 |
| 2,386,347 | 10/1945 | Roland | 260—86 |
| 2,668,809 | 2/1954 | Bryant et al. | 260—91.3 |
| 2,766,214 | 10/1956 | Erchak et al. | 260—29.6 |
| 2,796,413 | 6/1957 | Baer | 260—78.4 |
| 2,983,696 | 5/1961 | Tocker | 260—23 |
| 3,247,145 | 4/1966 | Masters et al. | 260—23 |
| 3,264,272 | 8/1966 | Rees | 260—78.5 |
| 3,309,181 | 3/1967 | Berkowitz et al. | 44—62 |
| 3,329,664 | 7/1967 | Tsuda et al. | 260—91.3 |
| 3,344,129 | 9/1967 | Bestian et al. | 260—87.3 |
| 3,393,183 | 7/1968 | Hicks et al. | 260—86.1 |
| 3,418,066 | 12/1968 | Caldwell et al. | 8—115.5 |
| 2,941,973 | 6/1960 | Kumnick et al. | 260—30.6 |

OTHER REFERENCES

Royals, E. Earl: Advanced Organic Chemistry, Prentice-Hall, Englewood Cliffs, N.J. (1954), pp. 600–610.

JOSEPH L. SCHOFER, Primary Examiner

J. C. HAIGHT, Assistant Examiner

U.S. Cl. X.R.

260—87.3, 91.3